United States Patent Office 3,532,670
Patented Oct. 6, 1970

3,532,670
NEW, HIGH-MOLECULAR, SOLUBLE, THERMO-PLASTIC, MODIFIED POLYPHENYL ETHER-SULPHONS AND PROCESS FOR THE PRODUCTION THEREOF
Hermann Schnell and Gerhard Darsow, Krefeld-Uerdingen, and Ludwig Bottenbruch, Krefeld-Bockum, Germany, assignors to Farbenfabriken Bayer Aktiengesellschaft, Leverkusen, Germany, a corporation of Germany
No Drawing. Filed Apr. 9, 1968, Ser. No. 719,842
Claims priority, application Germany, Apr. 20, 1967, F 52,191
Int. Cl. C08g 33/10
U.S. Cl. 260—49                                  8 Claims

ABSTRACT OF THE DISCLOSURE

Molar amounts of mixtures of (a) 4,4′-dihalodiphenyl-sulphones and hexachlorobenzene and (b) dialkali metal phenolates are reacted in strongly polar organic solvents at about 120 to about 160° C. to obtain modified polyphenyl ether-sulphones having increased flame resistance.

---

The present invention relates to high-molecular weight, soluble, thermoplastic, modified polyphenyl ether-sulphones and the process for the production thereof by reacting molar amounts of mixtures of aromatic polyhalogen compounds including 4,4′-dihalo-diphenyl-sulphones and dialkali metal phenolates in strongly polar organic solvents at temperatures between about 120 and about 160° C. The production of high-molecular, soluble, thermoplastic polyaryl polyethers, including polyaryl ether-sulphones, and of modified products of this type under the above conditions has been described in the Dutch patent application published under No. 6,408,130.

An object of the present invention is the production of new, modified polyphenyl ether-sulphones having increased flame resistance. The obvious way to achieve an increased flame resistance of the polyether-sulphones by reacting dihalo-diphenyl-sulphones with dialkali metal salts of halogenated diphenols fails because the reactivity of the halogenated phenolates is strongly hindered.

The process for the production of the new modified ethers comprises, broadly speaking, reacting molar amounts of mixtures of 4,4′-dihalo-diphenyl-sulphones and hexachlorobenzene on the one hand and dialkali metal phenolates on the other hand in strongly polar organic solvents at temperatures between about 120 and about 160° C. Preferably the molar ratios of the dihalo-sulphones and the hexachlorobenzene amount from about 95:5 to about 70:30.

Surprisingly, only two chlorine atoms of the hexachlorobenzene react in this process so that the hexachlorobenzene takes part in the synthesis of the high-molecular polyphenyl ether chains, similarly to the dihalo-diphenyl-sulphones, as a bifunctional aromatic halogen compound by reaction with dialkali metal phenolates, whereas the four non-reacting chlorine atoms give rise to an increase of the flame resistance of the polyphenyl ethers. Hence follows, that the flame resistance of the products is the higher, the higher is the proportion of condensed tetra-chlorophenylene residues.

The process of the invention corresponds approximately to the following formula:

wherein

Hal=halogen,
Ar=a bifunctional aromatic radical,
m=equal from about 2.3 to about 19 and
n=equal from about 10 to about 100.

Suitable dihalo-diphenyl-sulphones are mainly 4,4′-dichloro-diphenyl-sulphone and 4,4′-difluoro-diphenyl-sulphone, but dibromo and diiodo derivatives can also be used.

Suitable diphenols are mononuclear diphenols, such as hydroquinone or resorcinol, further, for example, dihydroxy-diphenyl, but preferably bisphenols of the general formula

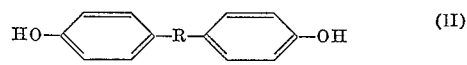

where R denotes a bivalent aliphatic, cycloaliphatic or araliphatic radical having 1–8 carbon atoms or —O—, —S—, —SO—, —SO$_2$— or —CO—. Examples are: bis-(4 - hydroxyphenyl) - methane, 1-bis-(4-hydroxyphenyl)-cyclohexane, bis - (4 - hydroxyphenyl)-phenylmethane, 4,4′-dihydroxy-diphenyl ether, sulphide, sulphoxide, benzophenone, but primarily 2,2-bis(4-hydroxyphenyl)-propane and 4,4′-dihydroxy-diphenyl-sulphone.

Thus, preferred Ar moieties of the present invention comprise

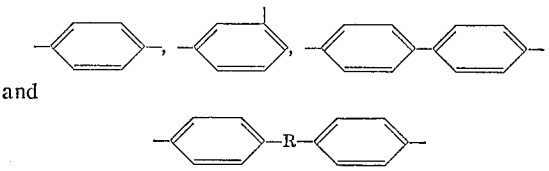

and wherein R is as aforesaid.

Besides the hydroxyl groups, the aromatic nuclei may contain additional substituents, e.g. the methyl group (2,2-bis-(3-methyl-4-hydroxyphenyl)-propane) with the proviso that spatially large substituents in a position adjacent to the hydroxyl groups do not impair the reactivity of the latter by sterical or any other hindrance.

To limit the molecular weight, there may be added chain breakers, for example, monophenols such as cresols, ethylphenol, propyl- and butyl-phenol and, particularly, p-tert.-butyl-phenol, in the form of their alkali metal salts.

For the preparation of the phenolates, all elements of the first main group of the Periodic Systems are suitable. The sodium and potassium salts are preferred for reasons of economy.

Examples of suitable polar organic solvents are diethyl sulphoxide, dimethyl-sulphone, diethyl-sulphone, di-isopropyl-sulphone and tetramethyl-sulphone, but primarily dimethyl sulphoxide.

To carry out the process, the mixture of 4,4′-dihalo-diphenyl-sulphone and hexachlorobenzene is introduced with a equimolar amount of dialkali metal phenolate into one of the solvents mentioned above and reacted at an elevated temperature, with the elimination of equimolar amounts of alkali metal chloride, to form a high-molecular polyphenyl ether-sulphone. To obviate oxidative side reactions, the reaction is carried out in an atmosphere of

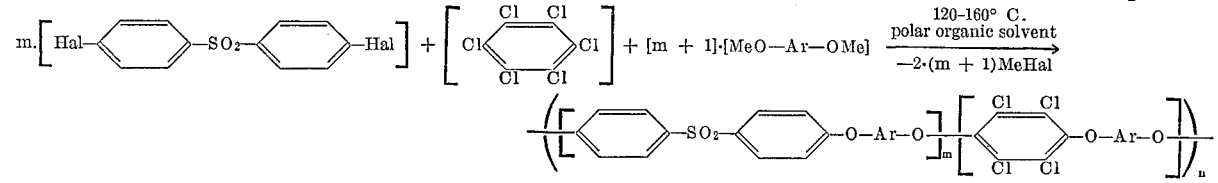

inert gas, e.g. nitrogen. If a polyether of high molecular weight is to be obtained, the water content of the reaction mixture must be below 0.5 percent by weight.

Some alkali metal salts of bisphenols can be freed from adhering water only with difficulty and it is therefore often difficult to reduce the water content of the reaction mixture according to the method described above to below 0.5 percent by weight; the dialkyl metal phenolates are therefore preferably prepared in situ, by dissolving the bisphenol in an apparatus which is continuously rinsed with nitrogen, in an amount of the polar solvent which is sufficient for the subsequent reaction, adding the stoichiometric amount of alkali metal hydroxide in solid form or in an aqueous solution, heating the mixture at about 120 to about 160° C. for some time, e.g. for 4–8 hours, and thus distilling off the water contained in the system. In order to achieve a more rapid and complete removal of the water, it is expedient to add an additional solvent, for example, benzene, toluene or chlorobenzene, and to distil off the water from the mixture azeotropically with the additional solvent, possibly under reduced pressure.

To the cooled solution of the phenolate in the polar solvent there is added the stoichiometric amount of a mixture of the 4,4′-dihalo-diphenyl-sulphone with hexachlorobenzene, expediently dissolved in the same solvent. The condensation is then carried out by heating this mixture at the aforesaid reaction temperatures for e.g. 3 to 4 hours, possibly in the presence of a monophenolate acting as chain breaker. The alkali metal halide formed in the condensation reaction is precipitated as an insoluble salt and can be separated from the solution in a simple manner by filtering it off. After cooling, the solution is mixed either with water or with a lower alcohol, such as methanol or ethanol. The polyphenyl ether-sulphone is thus precipitated in solid form. It is separated and thoroughly washed with water, in order to remove residues of salt and solvent.

It is further possible to react a mixture of two or more dialkali metal phenolates with an equimolar mixture of 4,4′-dihalo-diphenyl-sulphone and hexachlorobenzene.

The modified polyphenyl ether-sulphones which can be prepared according to the invention exhibit a good stability to damage by oxidation and to acidic or alkaline hydrolysis. They also have good mechanical properties and dimensional stability over a wide range of temperature. The good flame resistance or non-combustibility must be particularly mentioned. They can be used in the form of films, fibres, compression- and injection-moulded articles, varnishes and coatings whenever advantageous mechanical properties and a high thermal stability are important, in addition to non-combustibility, for example, in the textile and electric industries, in the construction of road and rail vehicles, in shipbuilding and in aircraft construction.

EXAMPLE 1

74.2 g. (0.325 mole) 2,2-bis-(4-hydroxyphenyl)-propane are weighed into a glass flask of 1 litre capacity and dissolved in 500 ml. dimethyl sulphoxide (DMSO). The glass flask is fitted with a gas feed tube, a stirrer, a thermometer, a reflux condenser and a water receiver filled with toluene. A slow nitrogen current is then passed through the apparatus, in order to generate an inert gas atmosphere. There are added 26.0 g. (0.68 mole) NaOH in the form of tablets, or an equivalent water-containing product, and 100 ml. toluene. The reaction mixture so obtained is heated at 140° C. for 8 hours whereby the water contained in the reaction mixture and the water resulting from the salt formation is continuously distilled off azeotropically with toluene. When the water is completely removed from the reaction mixture, the toluene is distilled off, the mixture is allowed to cool and 71.79 g. (0.25 mole) 4,4′-dichloro-diphenyl-sulphone and 21.36 g. (0.075 mole) hexachlorobenzene are added. The mixture is then heated with stirring at 140° C. for 4 to 5 hours, whereupon the sodium chloride formed in the condensation is rapidly precipitated. After cooling, the mixture is slowly poured into 5 litres of rapidly stirred water. The reaction product is thus precipitated in the form of a white powder. This is filtered off with suction and thoroughly washed with water, in order to remove residues of salt and solvent.

The polyphenyl ether-sulphone so obtained has a relative viscosity of $\eta r=1.35$ (measured on a solution of 0.5 g. in 100 ml. methylene chloride at 25° C.). It contains 7.6 percent by weight chlorine. Foils produced from this material exhibit a substantially improved flame resistance, as compared with a polycondensate of 2,2 - bis - (4-hydroxyphenyl)-propane and 4,4′ - dichloro - diphenyl-sulphone.

EXAMPLE 2

68.49 g. (0.3 mole) 2,2 - bis - (4-hydroxyphenyl)-propane are introduced into an apparatus according to Example 1 and dissolved in 500 ml. dimethyl sulphoxide. 24.0 g. (0.6 mole) NaOH in solid form and 100 ml. toluene are then added. The mixture is heated at 140° C. for 6 hours, whereby the water formed in the reaction is removed by azeotropic distillation with toluene. The toluene is then distilled off. When the solution has cooled, 63.56 g. (0.25 mole) 4,4′-difluoro-diphenyl-sulphone and 14.24 g. (0.05 mole) hexachlorobenzene are added. The mixture is heated at 140° C. for 4 hours while stirring. After cooling, the mixture is poured into 5 litres of rapidly stirred water. The condensation product is thus obtained in the form of a white powder. This is filtered off with suction, washed and dried.

The polyphenyl ether-sulphone so obtained has a relative viscosity of $\eta r=1.24$ (measured on a solution of 0.5 g. in 100 ml. tetrachloroethane/phenol 50:50 at 25° C.). It contains 5.6 percent by weight chlorine. Foils produced from this material exhibit a good flame resistance, as distinct from a polycondensate of 2,2-bis-(4-hydroxyphenyl)-propane and 4,4′-difluoro-diphenyl-sulphone.

EXAMPLE 3

55.86 g. (0.3 mole) 4,4′-dihydroxy-diphenyl are introduced into an apparatus according to Example 1 and dissolved in 500 ml. dimethyl sulphoxide. 24.0 g. (0.6 mole) NaOH in the form of tablets and 100 ml. toluene are then added. The mixture is heated at 140° C. for 6 hours, whereby the water formed in the reaction is removed by azeotropic distillation with toluene. After distilling off the toluene and after cooling of the residual solution, 71.79 g. (0.25 mole) 4,4′-dichloro-diphenyl-sulphone and 14.24 g. (0.05 mole) hexachlorobenzene are added. The mixture is heated at 140° C. for 6 hours while stirring. The mixture is then allowed to cool and slowly poured into 5 litres of rapidly stirred water. A white powder is obtained, which is filtered off with suction, washed and dried.

The polyphenyl ether-sulphone so obtained has a viscosity of $\eta r=1.18$ (measured on a solution of 0.5 g. in 100 ml. methylene chloride at 25° C.). It contains 5.9 percent by weight chlorine. Foils produced from this material exhibit a good flame resistance.

We claim:

1. A process for producing polyether-sulphones which comprises introducing a mixture containing 4,4′-dihalo-diphenyl-sulphone and hexachlorobenzene in a molar ratio of from 95:5 to about 70:30 with an equimolar amount of dialkali metal phenolate into a polar organic solvent selected from the group consisting of dimethylsulphoxide, diethylsulphoxide, dimethyl-sulphone, diethyl-sulphone, diisopropyl-sulphone and tetramethyl-sulphone at a temperature between 120 and about 160° C., said diphenolate being of a bisphenol selected from the group consisting of

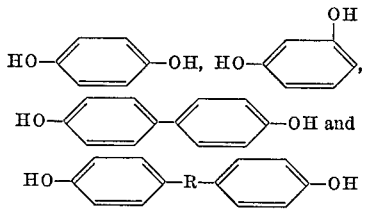

wherein R is a bivalent, aliphatic, cycloaliphatic or araliphatic radical having 1–8 carbon atoms or —O—, —S—, —SO—, —SO$_2$— or —CO—.

2. The process of claim 1 wherein said sulphone is 4,4′-dichloro-diphenyl-sulphone.

3. The process of claim 1 wherein the selected bisphenol for said phenolate is

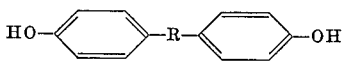

4. The process of claim 3 wherein —R— is

5. The process of claim 1 wherein the selected bisphenol for said phenolate is

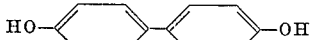

6. The process of claim 1 wherein the molecular weight of said sulphone is limited by adding a minor amount of a monophenol.

7. The process of claim 1 wherein said polar organic solvent is dimethylsulphoxide.

8. The product obtained by the process of claim 1.

No references cited.

WILLIAM SHORT, Primary Examiner
M. GOLDSTEIN, Assistant Examiner

U.S. Cl. X.R.
260—61